United States Patent [19]
Charles et al.

[11] Patent Number: 5,120,031
[45] Date of Patent: Jun. 9, 1992

[54] STRUT WITH STEER VARIABLE COMPRESSION RESTRICTOR ASSEMBLY

[75] Inventors: Harlan W. Charles, Harper Woods; Thadius F. Jozefczak, Warren, both of Mich.

[73] Assignee: General Motors Corporation, Detroit, Mich.

[21] Appl. No.: 702,552

[22] Filed: May 20, 1991

[51] Int. Cl.⁵ .................. F16F 11/00; B60G 17/00
[52] U.S. Cl. ................ 267/220; 188/322.11; 280/668; 280/693
[58] Field of Search ............ 267/220; 188/267, 279, 188/322.11, 192, 194; 280/668, 693, 691, 673

[56] References Cited

U.S. PATENT DOCUMENTS

| | | | |
|---|---|---|---|
| 4,805,886 | 2/1989 | Hassan | 267/220 |
| 4,817,928 | 4/1989 | Paton | 267/220 X |

FOREIGN PATENT DOCUMENTS 3502579  7/1986  Fed. Rep. of Germany ...... 280/668

Primary Examiner—Matthew C. Graham
Assistant Examiner—Josie A. Ballato
Attorney, Agent, or Firm—A. Michael Tucker

[57] ABSTRACT

A compression resistor assembly for use with a steerable suspension strut includes a canister mounted on a reciprocating piston rod of the strut. A plurality of longitudinal slots are provided in a cylindrical wall of the canister. An outwardly-projecting flange of the canister provides a camming surface for engaging guide pins of pivotable stoppers mounted on an upper end of the strut. For a predetermined steer angle of the strut, the guide pins are aligned with the slots to permit full compression of the strut. When the preselected steer angle is exceeded, the camming surface engages the guide pins so that the stoppers pivot to limit the compression of the strut.

5 Claims, 2 Drawing Sheets

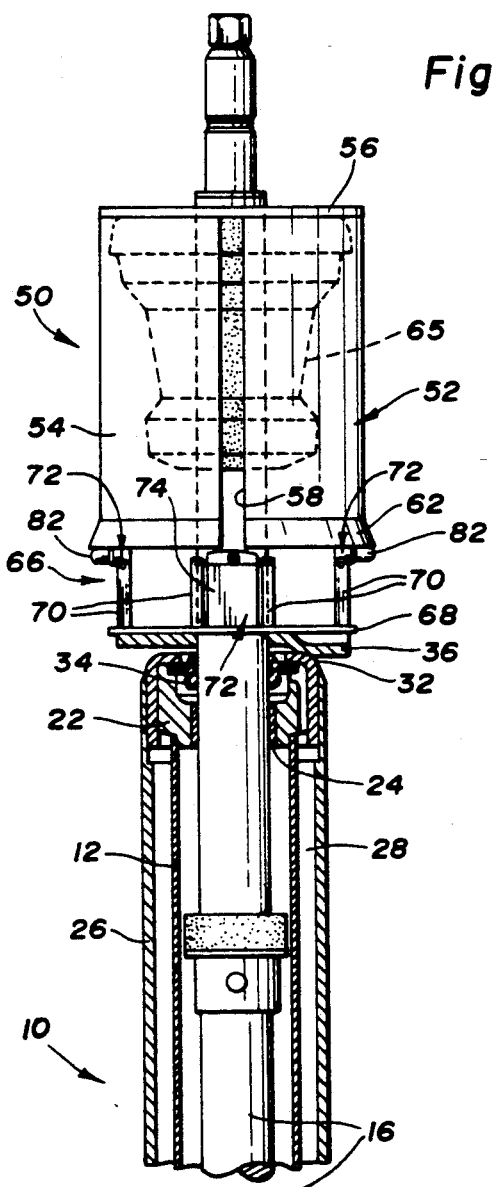
Fig. 1
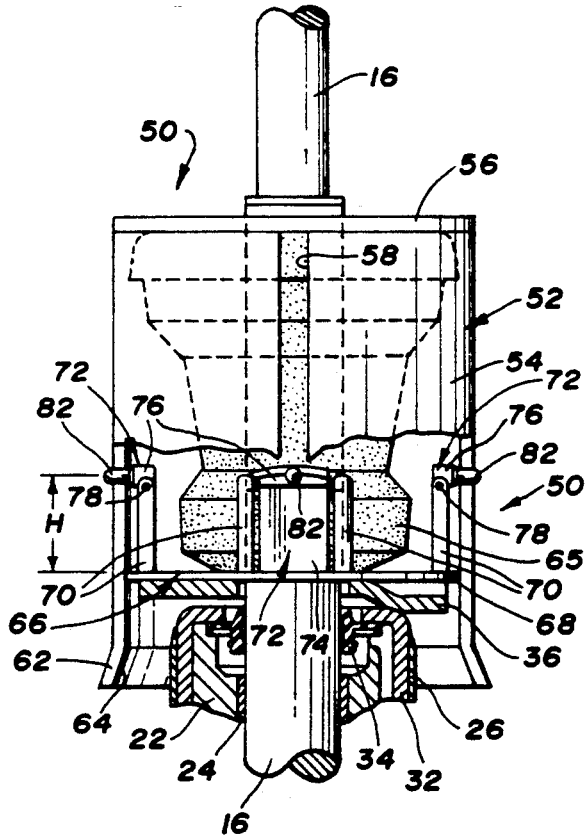
Fig. 2
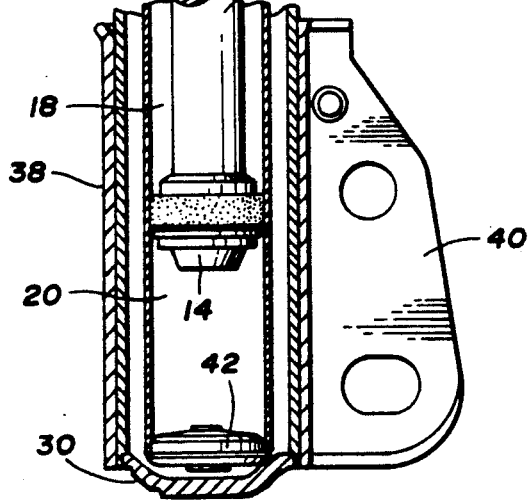

STRUT WITH STEER VARIABLE COMPRESSION RESTRICTOR ASSEMBLY

BACKGROUND OF THE INVENTION

1. Field of the Invention

The present invention relates generally to hydraulic dampers for vehicular suspension. In particular, this invention is concerned with a compression restrictor assembly for use with a steerable strut which provides reduced compression travel depending upon the steer angle of the strut.

2. Description of the Related Art

Hydraulic dampers, including shock absorbers and struts, are well-known in vehicular suspension systems. The rate of damping of a hydraulic strut is often tuned by a piston valving assembly and/or base valving assembly. Conventional piston and base valving assemblies employ various disk packs and spring biased blow-off elements. During compression and rebound strokes of a strut, fluid flow through these valving assemblies determines the type of damping characteristic produced by the strut.

The art continues to seek improvements. It is desirable to provide a compression restrictor which prevents a strut from fully compressing at large steer angles. Prevention of the compression of a strut restricts body lean and results in better road handling. Furthermore, a tighter wheel-to-body relationship for body styling can be accomplished when strut compression is limited.

SUMMARY OF THE INVENTION

The present invention includes a restrictor assembly for preventing full compression of a steerable hydraulic strut. Reduction of strut compression is controlled by the steer angle of the vehicle's wheels. The restrictor assembly is economical to manufacture and can be adapted for use with conventional struts.

In a preferred embodiment, a compression resistor assembly for use with a steerable suspension strut includes a canister mounted on a reciprocating piston rod of the strut. A plurality of longitudinal slots are provided in a cylindrical wall of the canister. An outwardly-projecting flange of the canister provides a camming surface for engaging guide pins of pivotable stoppers mounted on an upper end of the strut. For a predetermined steer angle of the strut, the guide pins are aligned with the slots to permit full compression of the strut. When the preselected steer angle is exceeded, the camming surface engages the guide pins so that the stoppers pivot to limit the compression of the strut.

BRIEF DESCRIPTION OF THE DRAWINGS

FIG. 1 is a longitudinal sectional view of a steerable hydraulic strut illustrating a compression restrictor assembly according to the present invention mounted on top of the strut.

FIG. 2 is an enlarged view of the compression restrictor assembly with parts broken away illustrating guide pins received within longitudinal slots in a canister to permit full compression of the strut.

DETAILED DESCRIPTION OF THE PREFERRED EMBODIMENT

Figures 3, 4, 5:
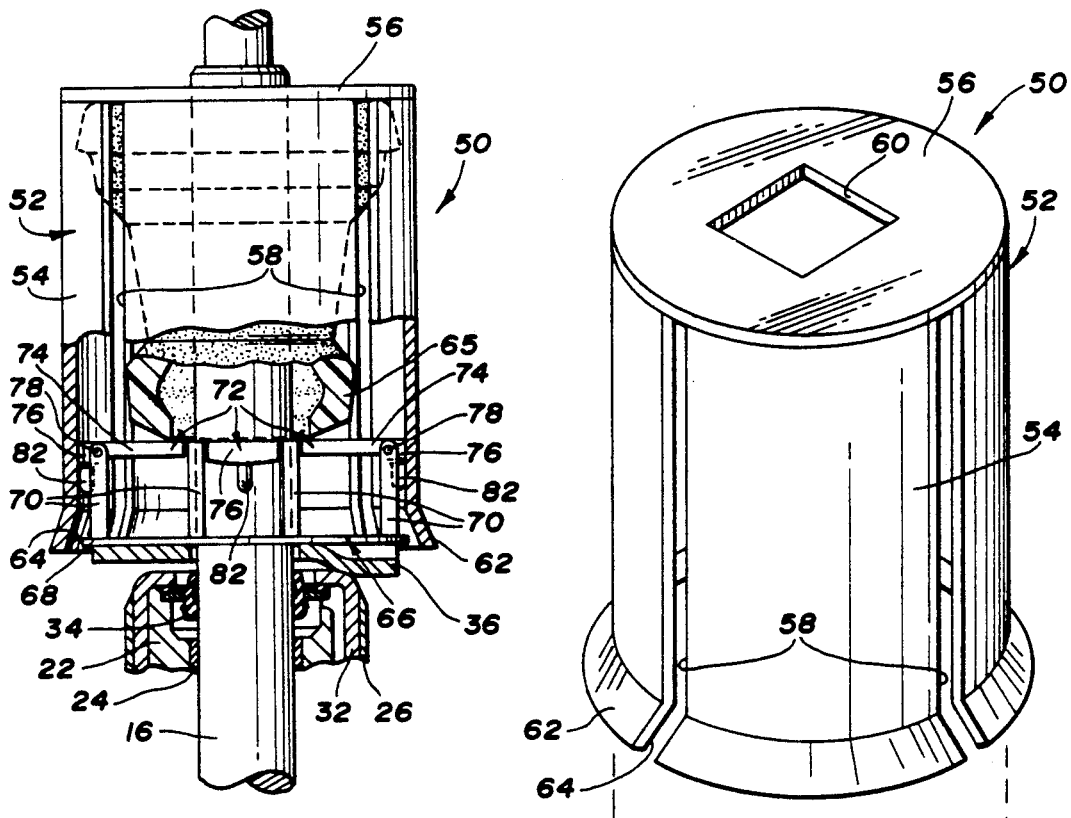
FIG. 3 is a view similar to FIG. 2 wherein the strut has been rotated so that the guide pins are not aligned in the canister slots, thereby pivoting the stoppers to limit compression of the strut.
FIG. 4 is an exploded perspective view of the compression restrictor assembly removed from the strut of FIGS. 1 through 3 illustrating the pivotable stoppers mounted on a base and the canister having longitudinal slots for receiving guide pins of respective stoppers.
FIG. 5 is a greatly enlarged view of a spring mounted between a support and the pivotable stopper.

A steerable strut is indicated generally at 10 in FIG. 1. The strut 10 includes a fluid-filled inner cylinder 12 mounting a reciprocating piston 14. A piston rod 16 is connected at its inner end to the piston 14 and at its outer end to a vehicular body (not illustrated) in any conventional manner. The piston 14 divides the interior volume of the inner cylinder 12 into an upper chamber 18 and a lower chamber 20. The upper end of the inner cylinder 12 is closed by a rod guide 22 having an annular bearing 24. A reservoir tube 26 is concentrically mounted about and receives the inner cylinder 12. A fluid reservoir 28 is formed between the inner cylinder 12 and the reservoir tub 26. The lower end of the reservoir tube 26 is closed by an end cap 30 and the upper end of the reservoir tube 26 is closed by a seal cover 32. An elastomeric seal assembly 34 is provided between the rod guide 22 and the seal cover 32. A bump plate 36 is secured to an upper surface of the seal cover 32.

A partly cylindrical bracket 38 fixedly receives the lower end of the strut 10 and is connected to a wheel assembly (not illustrated) at a mounting flange 40 in a well-known manner. As the wheel assembly is turned to steer a vehicle, rotational movement is imparted to the strut 10 about its longitudinal axis. Rotational movement is transferred from the bracket 38 to the reservoir tube 26, the seal cover 32, and the bump plate 36. Such rotational movement occurs while the piston rod 16 remains fixed to the vehicle body.

During operation, the piston 14 and piston rod 16 reciprocate in the inner cylinder 12. Internally contained valving (not illustrated) in the piston 14 controls fluid flow between the upper and lower chambers 18, 20. A compression valve assembly 42 mounted at and closing the lower end of the inner cylinder 12 controls fluid flow between the lower chamber 20 and the reservoir 28 in a well-known manner.

A compression restrictor assembly indicated generally at 50 is shown mounted on top of the bump plate 36 in FIGS. 1-3 and in exploded perspective in FIG. 4. The restrictor assembly 50 includes a slotted canister 52 formed from any suitable material capable of resisting axial deformation. The canister 52 includes a cylindrical wall 54 closed at one end by an end wall 56. A plurality of longitudinal slots 58 are radially-spaced in the cylindrical wall 54. An opening 60 is provided in the end wall 56 for receiving the piston rod 16. Preferably, an outwardly projecting flange 62 is provided at the end of the canister 52 opposite the end wall 56. The inner surface 64 of the flange 62 serves as a camming surface as described below. An elastomeric jounce bumper 65 is secured to an inner surface of the end wall 56 and functions in a well-known manner as the strut 10 undergoes compression during operation. The canister 52 and jounce bumper 65 are secured to the piston rod 16 in any suitable manner so that they reciprocate with the piston rod 16 during use and further so that they do not rotate with respect to the piston rod 16.

The canister 52 and jounce bumper 65 cooperate with a limit assembly 66 to reduce the amount of compression of the strut 10 as described below. The limit assembly 66 includes a base 68 having a central opening 69 for receiving the piston rod 16. The base 68 is secured to an upper surface of the bump plate 36 by any suitable means so that rotational movement imparted to the bump plate 36 through the seal cover 32, reservoir tube 26, and bracket 38 is transmitted to the base 68.

Around the circumference of the base 68, a plurality of paired supports 70 project upwardly from an upper surface. In the embodiment illustrated in the figures, each pair of supports 70 mounts a pivoting stopper 72. Each stopper 72 is an L-shaped member having a long leg 74 extending a height H (FIG. 2) and a short leg 76 extending perpendicular to the long leg 74. Preferably, a pair of pins or axles 78 are inserted to opposite sides of the stopper 72 to pivotally mount the stopper 72 between the supports 70. A coil or helical spring 80, illustrated in FIG. 5, is mounted about at least one pin 78 and is secured at each end to either the stopper 72 or the support 70. The spring 80 biases the stopper 72 in the upward position illustrated in FIGS. 1, 2 and 4.

A guide pin 82 projects outwardly from each of the short legs 76. The guide pins 82 are constructed and arranged to provide an indexing mechanism with the longitudinal slots 58 of the canister 52. The width of the slots 58 is sufficient to permit a rotational movement of the strut 10 through the reservoir tube 26 of a predetermined amount (e.g., approximately 5°) when a wheel assembly is turned. If a turning angle of 5° or less is made, the guide pins 82 align with respective slots 58 and permit full compression of the strut 10 during use. However, when the steer angle of the strut 10 is greater than 5°, then the guide pins 82 are forced against the camming surface 64 of the flange 62 as compression of the strut 10 begins. As the strut 10 continues to compress, guide pins 82 against the camming surface 64 cause the stoppers 72 to pivot so that each long leg 74 is approximately parallel with the base 68 as illustrated in FIG. 3 and in phantom in FIG. 4. As each stopper 72 pivots to this position, the horizontally projecting long legs 74 of the stoppers 72 provide a limiting surface against which the jounce bumper 65 engages as the strut 10 compresses. In this manner, full compression of the strut 10 is prevented. The amount by which compression is reduced is dependent upon the height H of each stopper 72. It is appreciated that this dimension can be changed to provide a desired limiting assembly 66.

Upon rebound, the strut 10 moves downwardly from the canister 52 so that the stoppers 72 are permitted to return to their original upstanding positions through the coil springs 80. In this manner, upon the next compression of the strut 10, the compression restrictor assembly 50 can again prevent full compression of the strut 10 depending upon the steer angle of the strut 10.

Although the present invention has been described with reference to preferred embodiments, workers skilled in the art will recognize that changes may be made in form and detail without departing from the spirit and scope of the invention.

The embodiments of the invention in which an exclusive property or privilege is claimed are defined as follows:

1. A compression restrictor assembly for use with a steerable strut having a reciprocable piston rod extending from one end thereof, comprising:
    (a) a base mounted on an upper portion of the strut;
    (b) limiting means projecting upwardly from the base; and
    (c) cam means mounted on the piston rod and indexed with the limiting means so that at a preselected steering turn angle of the strut relative to the compression restrictor assembly, the limiting means is engaged by the cam means to limit the range of compression of the strut.

2. The compression restrictor assembly specified in claim 1 wherein the limiting means comprises at least one stopper pivotally mounted on the limiting means.

3. The compression restrictor assembly specified in claim 2 wherein the stopper includes a guide pin indexed with the cam means.

4. The compression restrictor assembly specified in claim 3 wherein the cam means includes a canister having a respective longitudinal slot for receiving the guide pin and an outwardly-projecting flange for engaging the guide pin.

5. A compression restrictor assembly for use with a steerable strut, comprising:
    (a) a canister, having a cylindrical wall, closed at one end by an end wall and fixed to a reciprocating piston rod of the strut;
    (b) a plurality of longitudinal slots in the canister cylindrical wall;
    (c) a planar base, fixed to an upper end of the strut, having a plurality of upstanding, paired supports;
    (d) a spring-biased stopper mounted between each pair of supports;
    (e) a guide pin projecting from each stopper and aligned with a respective longitudinal slot of the canister; and
    (f) cam means provided on the canister for engaging the guide pins and pivoting the stoppers to reduce compression of the piston rod when the strut is rotated a predetermined angle.

* * * * *